March 14, 1933.　　　M. EASTHAM　　　1,901,343
ELECTRIC INSTRUMENT
Filed March 30, 1931
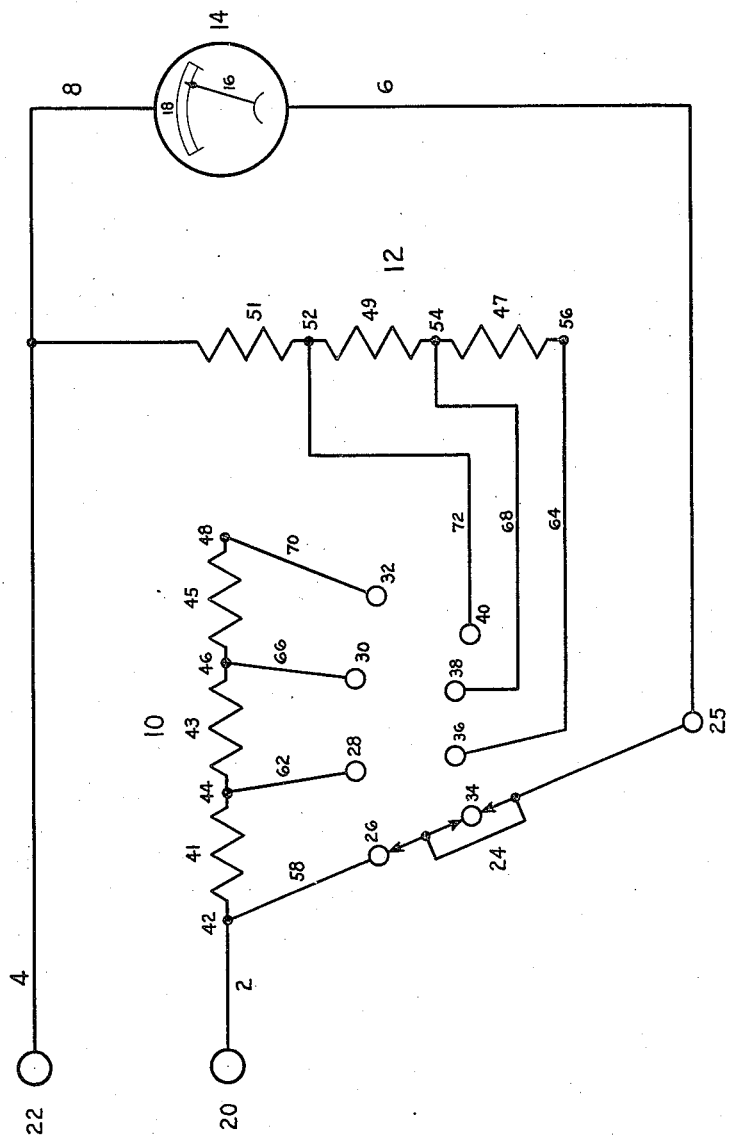
INVENTOR.
Melville Eastham
BY
David Rines
ATTORNEY.

Patented Mar. 14, 1933

1,901,343

UNITED STATES PATENT OFFICE

MELVILLE EASTHAM, OF CAMBRIDGE, MASSACHUSETTS, ASSIGNOR TO GENERAL RADIO COMPANY, OF CAMBRIDGE, MASSACHUSETTS, A CORPORATION OF MASSACHUSETTS

ELECTRIC INSTRUMENT

Application filed March 30, 1931. Serial No. 526,170.

The present invention relates to electric instruments, such as meters, and more particularly to meters for measuring voltage, current, power, and similar magnitudes. Instruments of such character, like voltmeters, ammeters, galvanometers and the like, are known in the art as A. C. meters, and will be so designated herein. From a more specific aspect, the invention relates to A—C indicating meters. Still more restrictedly, the invention relates to meters for making measurements in the audio-frequency or voice-frequency spectrum.

An object of the invention is to provide a new and improved instrument of the above-described character that shall be simple to construct, portable, cheap to manufacture, efficient in operation, rugged and durable.

A further object is to provide a new and improved instrument for measuring the power output of radio receivers and other devices. Other objects will be explained hereinafter.

The invention will now be explained in connection with the accompanying drawing, the single figure of which is a diagrammatic view of circuits and apparatus arranged and constructed according to a preferred embodiment of the invention.

The invention comprises a suitable multiplier or network having an input connection, represented by conductors 2, 4 and an output connection, represented by conductors 6, 8. The network may assume any of a number of different forms, but is illustrated, for simplicity, as a single, inert L-type, attenuation section consisting of a variable series resistor branch or arm 10 and a variable shunt resistor branch or arm 12. A suitable indicating meter 14 is connected in the output, and is provided with an indicator 16 adapted to travel over a suitably graduated scale 18. The input connection is adapted to be connected with terminals 20, 22 of any source of voltage, current, power, etc. that it is desired to measure. The meter 14 may be of any desired type, such as the thermionic, thermocouple, and the hot-wire ammeter types, but it is preferred to employ a voltmeter of the copper-oxide-rectifier type.

Let it be assumed, to fix the ideas, that it is desired to measure the voltage developed across the terminals 2, 4 by any source of power,—for example, a radio receiver. This assumption is perfectly general. Ammeters, for example, operate upon the same principle as voltmeters, the measurement of currents involving merely the measurement of the voltage drop across a known impedance; so that to measure current, all that is necessary is to consider the terminals 20, 22 to be connected together by a resistor or other impedance. Power may similarly be measured if the impedance across which the voltage is observed is assumed to be constant during the measurement.

To extend the range of measurement of the instrument, it is provided with a contact arm 24 pivoted at 25, and adapted to occupy four positions. The contact arm 24 contacts with a pair of contact members 26, 34, in its first position; a second pair of contact members 28, 36, in its second position; a third pair of contact members 30, 38 in its third position; and a fourth pair of contact members 32, 40 in its fourth position. Any desired number of pairs of contact members may be employed, depending upon the range that the instrument is designed for.

To explain the operation, let it be assumed that the indications of the indicator 16 on the scale 18 are correctly given on the scale when the contact arm 24 occupies its first position, in which it contacts with the contact members 26 and 34. Then, when the contact arm 24 occupies its second position, in which it contacts with the contact members 28 and 36, the readings of the indicator 16 on the scale 18 should be multiplied, for example, by five; and the multiplicand may similarly be twenty and fifty, respectively, when the contact arm occupies its third and fourth positions, in which it contacts with the pair of contact members 30 and 38 and the pair of contact members 32 and 40, respectively. If the range is 3 volts in the initial position of the contact arm 24, the range may thus be increased to 15, 60 or 150 volts; or, for that matter, depending upon the design, to any other desired value. It will presently be explained how this result is brought about in accordance with the present invention.

A feature of the invention resides in having the input impedance substantially the same irrespective of the adjustment of the contact arm 24. To this end, the branches 10 and 12 are respectively divided into suitably designed sections 41, 43, 45 and 47, 49, 51, separated by terminals 42, 44, 46, 48 and 52, 54 and 56, respectively. The terminals 42, 44, 46 and 48 are respectively connected with the contact members 26, 28, 30 and 32 by conductors 58, 62, 66 and 70. The terminals 56, 54 and 52 are similarly connected with the contact members 36, 38 and 40 by conductors 64, 68 and 72, respectively. The contact member 34 is open-circuited.

When the contact arm 24 occupies its first, or illustrated position, in which it contacts with the contact members 26 and 34, a circuit is established from the terminal 22, by way of conductors 4 and 8, to the meter 14. The shunt resistor 12 is at this time open-circuited and the series resistor 10 is effectively reduced to zero. The circuit continues, by way of the conductor 6, through the pivot 25, the arm 24 and the contact member 26, and by way of the conductors 58 and 2, back to the terminal 20. In this position of the contact arm, therefore, the meter 14 is thrown directly across the line, and the input impedance is the impedance of the meter. For convenience, let this be 4000 ohms, as hereinafter mentioned.

When the contact arm 24 occupies its second position, in which it bridges the contact members 28 and 36, the circuit is as follows: from the terminal 22, by way of the conductor 4, to the conductor 8, and the resistor 12 in parallel. The current passing along the conductor 8 passes through the meter 14 to the point 25 and contact arm 24, as before described. The circuit continues by way of the contact members 36 and 28, and the conductor 62, to the terminal 44, so that the circuit includes the portion 41 of the resistor 10 between the terminals 42 and 44.

The parallel branch circuit through the resistor 12 contains the whole resistor 12, the circuit continuing from the point 56, by way of the conductor 64, to the terminal 36.

The parts are so designed that the total impedance of the shunt circuit, comprising the whole of resistor 12 and the meter, plus the portion 41 of the series resistor 10 between the terminals 42 and 44 shall be the same as when the contact arm 24 occupies its first position, say, as before, 4000 ohms.

In its third position, the contact arm 24 bridges the terminals 30 and 38, with the result that the series circuit contains the portions 41 and 43 of the resistor 10 between the terminals 42 and 46, and the shunt circuit contains the whole of the resistor 12, except that between the terminals 54 and 56. The total impedance of the network comprising these portions of the resistors 10 and 12 and the meter is again 4000 ohms.

In the fourth position of the contact arm 24, the whole series resistor 10 and that portion only of the resistor 12 between the conductor 4 and the terminal 52 are connected in circuit. Here, too, the total impedance, including the meter, is 4000 ohms.

The resistors comprising the arms 10 and 12 are so constructed that their resistance is independent of frequency throughout the range over which the instrument is to be used. The impedance being thus constant for all frequencies, and irrespective of the position of the contact arm 24, it is possible from the measurements of the meter 14 to compute the power output.

When the meter is designed so as to have the 4000-ohms impedance, the measurements will be made under conditions corresponding to the use of an ordinary, cone, loud speaker. The invention is not, however, restricted to use with radio receivers, for it may be employed to measure the power output of any device operating over a frequency range, for example, of from 20 to 10,000 cycles per second and beyond. The invention may be used to test audio-frequency amplifiers of a public-address system. It is applicable to such various uses as to determine line voltage in the laboratory and the voltage applied to vacuum-tube filaments. It is useful in applications where it is desired to indicate the voltage determined by a substantially constant driving load.

Connections may be made in any desired manner. For example, to measure the output of a radio receiver, the terminals 20, 22 may be connected by a winding (not shown) for coupling to the output winding of the receiver.

Modifications may obviously be made by persons skilled in the art, and all such are considered to fall within the spirit and scope of the invention, as defined in the appended claims.

What is claimed is:

1. An instrument of the class described having, in combination, a network having a series arm and a shunt arm, an input connection and an output connection connected with the network, a meter connected with the output connection and provided with an indicator having a predetermined range of movement, and means for adjusting the series arm and the shunt arm to vary the significance of the indications of the indicator and for maintaining the impedance of the network and the meter substantially constant irrespective of the adjustment of the series arm and the shunt arm.

2. An instrument of the class described having, in combination, a network having a series arm and a shunt arm, an input connection and an output connection connected with the network, a copper-oxide-rectifier-type meter connected with the output connection and provided with an indicator having a predetermined range of movement, and means for adjusting the series arm and the shunt arm to vary the significance of the indications of the indicator and for maintaining the impedance of the network and the meter substantially constant irrespective of the adjustment of the series arm and the shunt arm.

In testimony whereof, I have hereunto subscribed my name.

MELVILLE EASTHAM.